US012763477B2

(12) United States Patent
Lin et al.

(10) Patent No.: US 12,763,477 B2
(45) Date of Patent: Oct. 13, 2026

(54) ANTENNA DEVICE

(71) Applicants: INVENTEC (PUDONG) TECHNOLOGY CORPORATION, Shanghai (CN); INVENTEC CORPORATION, Taipei City (TW)

(72) Inventors: Hsin-Hung Lin, Taipei City (TW); Yu Shu Tai, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 0 days.

(21) Appl. No.: 19/244,471

(22) Filed: Jun. 20, 2025

(65) Prior Publication Data

US 2026/0149185 A1 May 28, 2026

(30) Foreign Application Priority Data

Nov. 25, 2024 (CN) ......................... 202411703240.8

(51) Int. Cl.

*H01Q 13/10* (2006.01)
*H01Q 1/22* (2006.01)
*H01Q 1/40* (2006.01)
*H01Q 5/50* (2015.01)

(52) U.S. Cl.

CPC ........... *H01Q 13/10* (2013.01); *H01Q 1/2291* (2013.01); *H01Q 1/405* (2013.01); *H01Q 5/50* (2015.01)

(58) Field of Classification Search

CPC ........ H01Q 1/2291; H01Q 1/405; H01Q 5/50; H01Q 9/40; H01Q 13/10

See application file for complete search history.

(56) References Cited

FOREIGN PATENT DOCUMENTS

CN 222483697 U * 2/2025 ............... H01Q 5/10

* cited by examiner

*Primary Examiner* — Daniel Munoz
(74) *Attorney, Agent, or Firm* — Maschoff Brennan

(57) ABSTRACT

An antenna device includes a resonance casing, a substrate, a high frequency component and a low frequency component. The substrate is disposed on the resonance casing. The high frequency component is disposed on the substrate, and has a high frequency excitation slot and a high frequency matching slot. The low frequency component includes a first low frequency portion, a second low frequency portion and a third low frequency portion. The first low frequency portion, the second low frequency portion and the third low frequency portion are located on a side of the high frequency component. The second low frequency portion is connected to the high frequency component. The high frequency component, the first low frequency portion and the second low frequency portion together surround the third low frequency portion. A side of the second low frequency portion has a low frequency matching slot.

10 Claims, 6 Drawing Sheets

ANTENNA DEVICE

CROSS-REFERENCE TO RELATED APPLICATIONS

This non-provisional application claims priority under 35 U.S.C. § 119(a) on Patent Application No(s). 202411703240.8 filed in China, on Nov. 25, 2024, the entire contents of which are hereby incorporated by reference.

BACKGROUND OF THE INVENTION

Technical Field of the Invention

The invention relates to an antenna device, more particularly to an antenna device including a resonance casing, a substrate, a high frequency component and a low frequency component.

Description of the Related Art

With the advancement of mobile communication technology, various electronic devices are evolving to offer more diversified functions, become lighter and thinner, and achieve aster and more efficient data transmission. In particular, mobile communication technology is expected to enter the WiFi 7 era, meeting various life applications and business requirements that WiFi 6E has not fulfilled. By using the frequency band of WiFi 7, the bandwidth can be expanded to enable faster communication speeds. Accordingly, the frequency band of WiFi 7 can be applied to various fields such as high-resolution video streaming, virtual reality (VR), augmented reality (AR), autonomous vehicles, industrial automation, telemedicine, smart cities, smart agriculture and smart manufacturing.

However, the conventional antenna devices of the electronic devices are susceptible to interference caused by signal noises during wireless signal transmission. Accordingly, a signal quality can be degraded, and a communication stability can be adversely affected. Therefore, how to reduce the interference to the antenna devices caused by signal noises so as to enhance the communication stability is one of the key issues that researchers need to address.

SUMMARY OF THE INVENTION

The invention provides an antenna device for reducing the interference thereto caused by signal noises so as to enhance the communication stability.

One embodiment of the invention provides an antenna device including a resonance casing, a substrate, a high frequency component and a low frequency component. The substrate is disposed on the resonance casing. The high frequency component is disposed on the substrate. The high frequency component has a high frequency excitation slot and a high frequency matching slot spaced apart from each other. The high frequency excitation slot has a wide section and a narrow section. The wide section is connected to the narrow section. A width of the wide section is greater than a width of the narrow section. The low frequency component includes a first low frequency portion, a second low frequency portion and a third low frequency portion. The first low frequency portion, the second low frequency portion and the third low frequency portion are disposed on the substrate, and are located on a side of the high frequency component. The first low frequency portion is located on a side of the narrow section away from the wide section. The second low frequency portion is connected to the high frequency component, and is adjacent to the high frequency matching slot. The third low frequency portion is spaced apart from the high frequency component. The high frequency component, the first low frequency portion and the second low frequency portion together surround the third low frequency portion. A side of the second low frequency portion away from the third low frequency portion has a low frequency matching slot. The first low frequency portion includes a base, a first protrusion, a second protrusion, a third protrusion and a fourth protrusion. The first protrusion, the second protrusion, the third protrusion and the fourth protrusion are sequentially arranged and connected to the base, and extend toward the high frequency component. The first protrusion is connected to a portion of the high frequency component close to the narrow section. A first low frequency excitation slot is formed between the first protrusion and the second protrusion. A second low frequency excitation slot is formed between the second protrusion and the third protrusion. A third low frequency excitation slot is formed between the third protrusion and the fourth protrusion. The third low frequency portion and the second low frequency portion correspond to the second low frequency excitation slot and the third low frequency excitation slot, respectively.

According to the antenna device disclosed in the above embodiment, the substrate of the antenna device is disposed on the resonance casing. The high frequency component has a high frequency excitation slot and a high frequency matching slot. The third low frequency portion and the second low frequency portion of the low frequency component correspond to the second low frequency excitation slot and the third low frequency excitation slot, respectively. Therefore, the antenna device can have or correspond to the frequency band of WiFi 7, and the return loss of this frequency band can be reduced so as to meet communication requirements of WiFi 7. In addition, signal noises can be reduced via the combination of the substrate and the resonance casing. Accordingly, the communication stability of the antenna device can be enhanced, thereby improving the communication quality of the antenna device.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
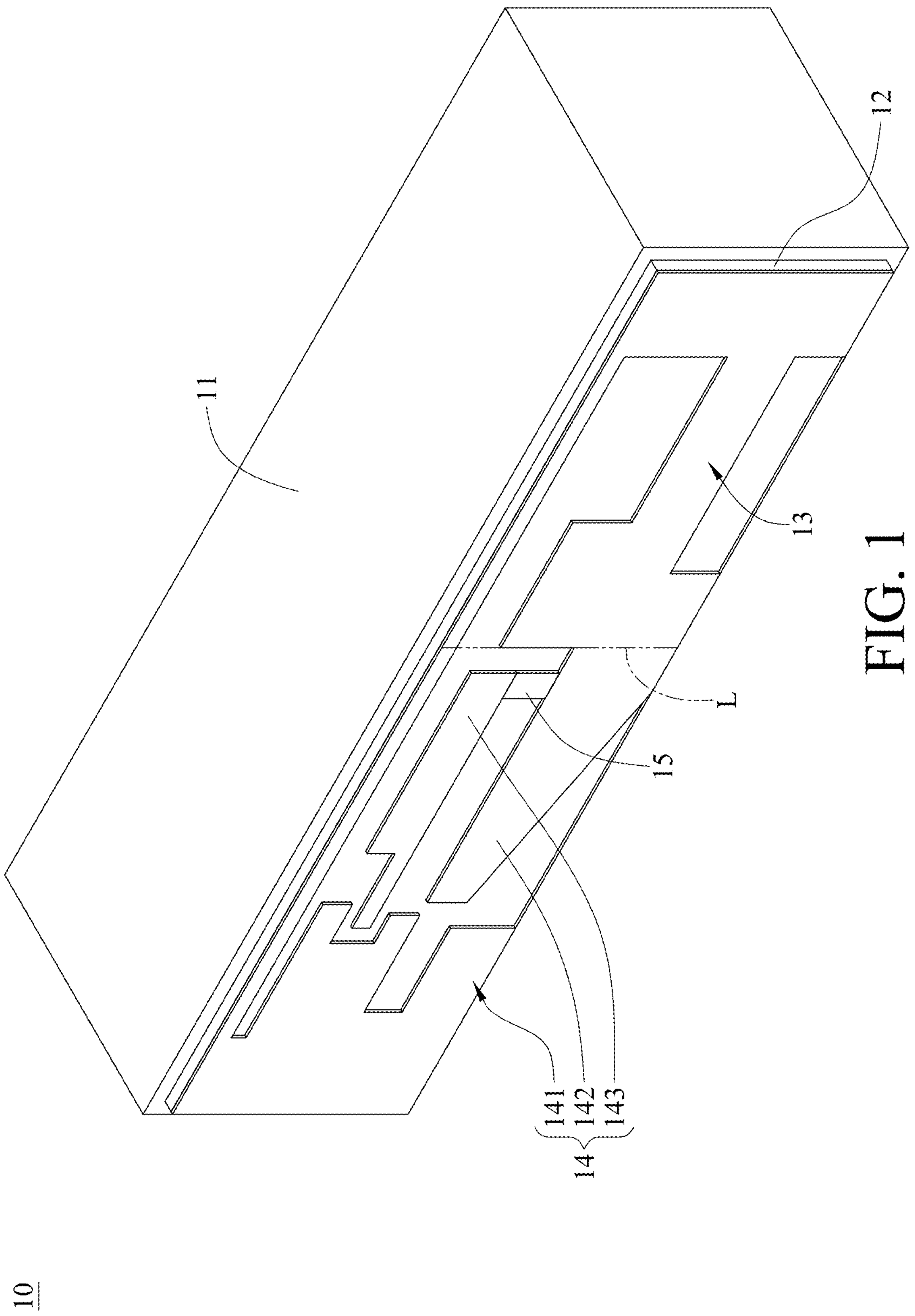
FIG. 1 is a perspective view of an antenna device in accordance with an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
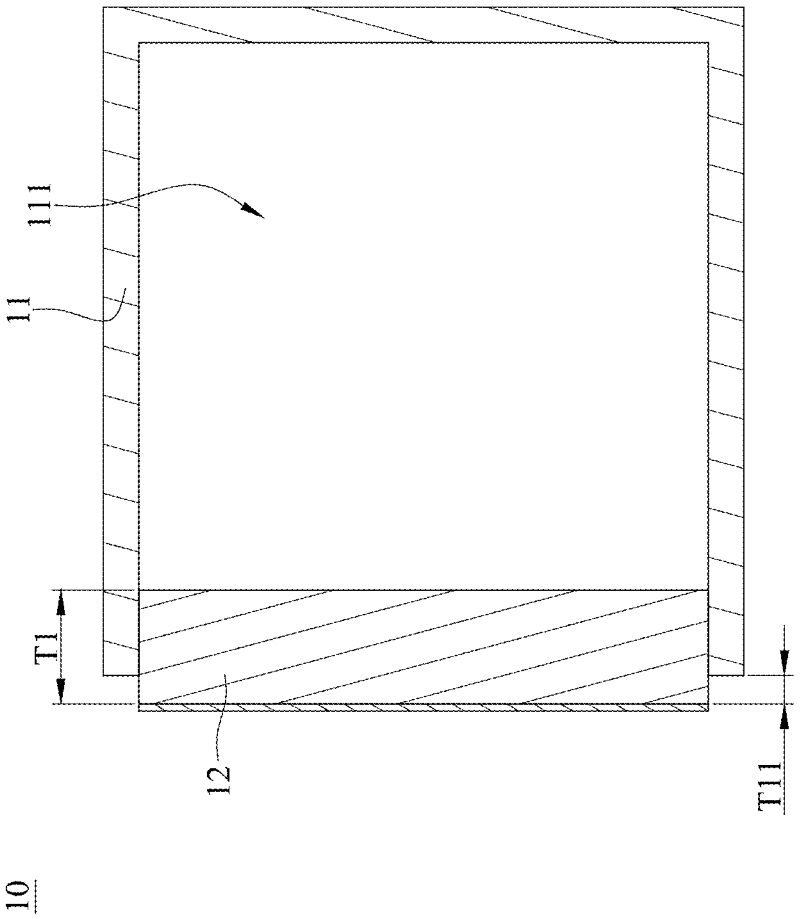
FIG. 2 is a cross-sectional view of the antenna device in FIG. 1.
Figure 3:
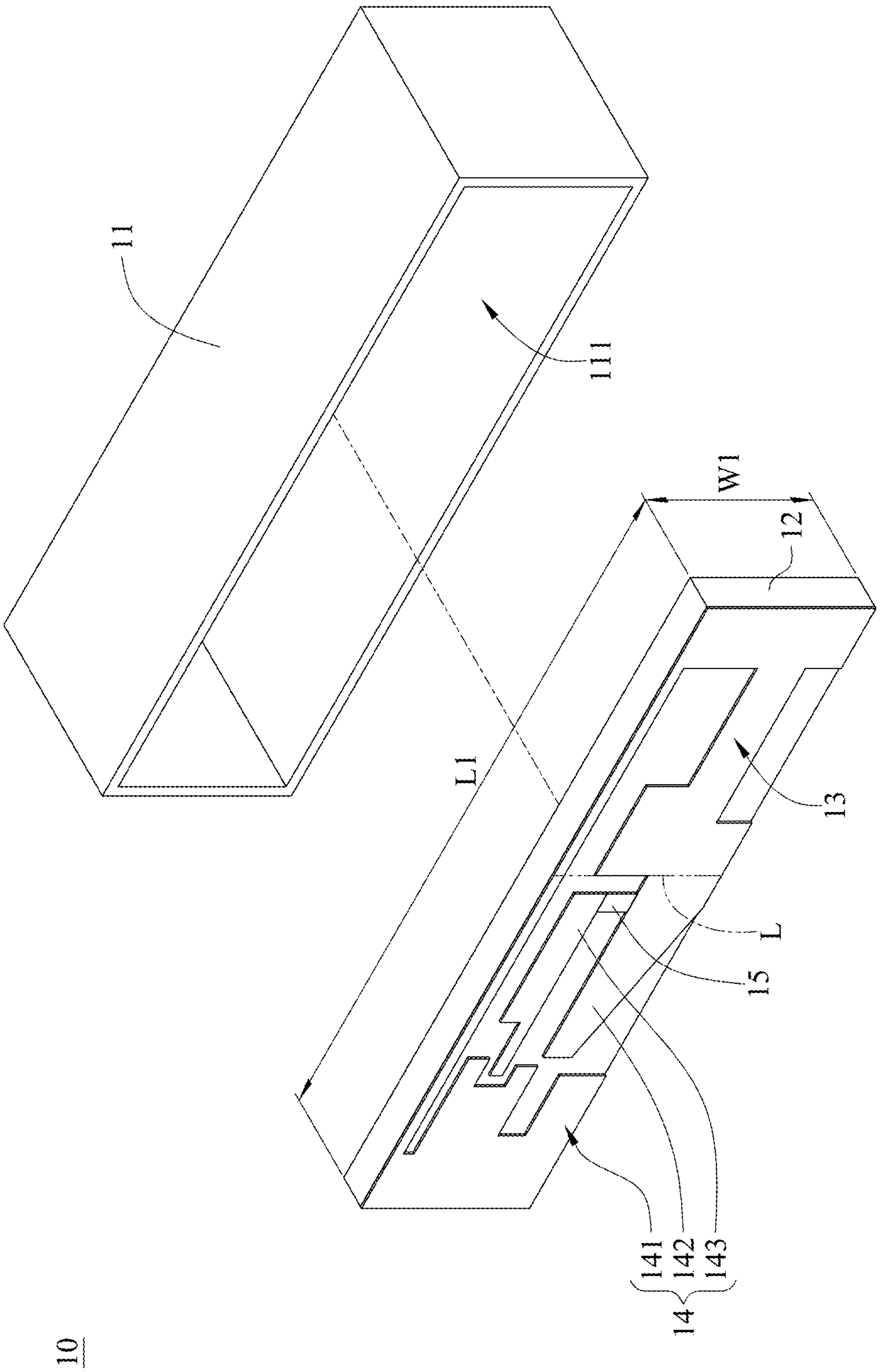
FIG. 3 is an exploded view of the antenna device in FIG. 1.
Figure 4:
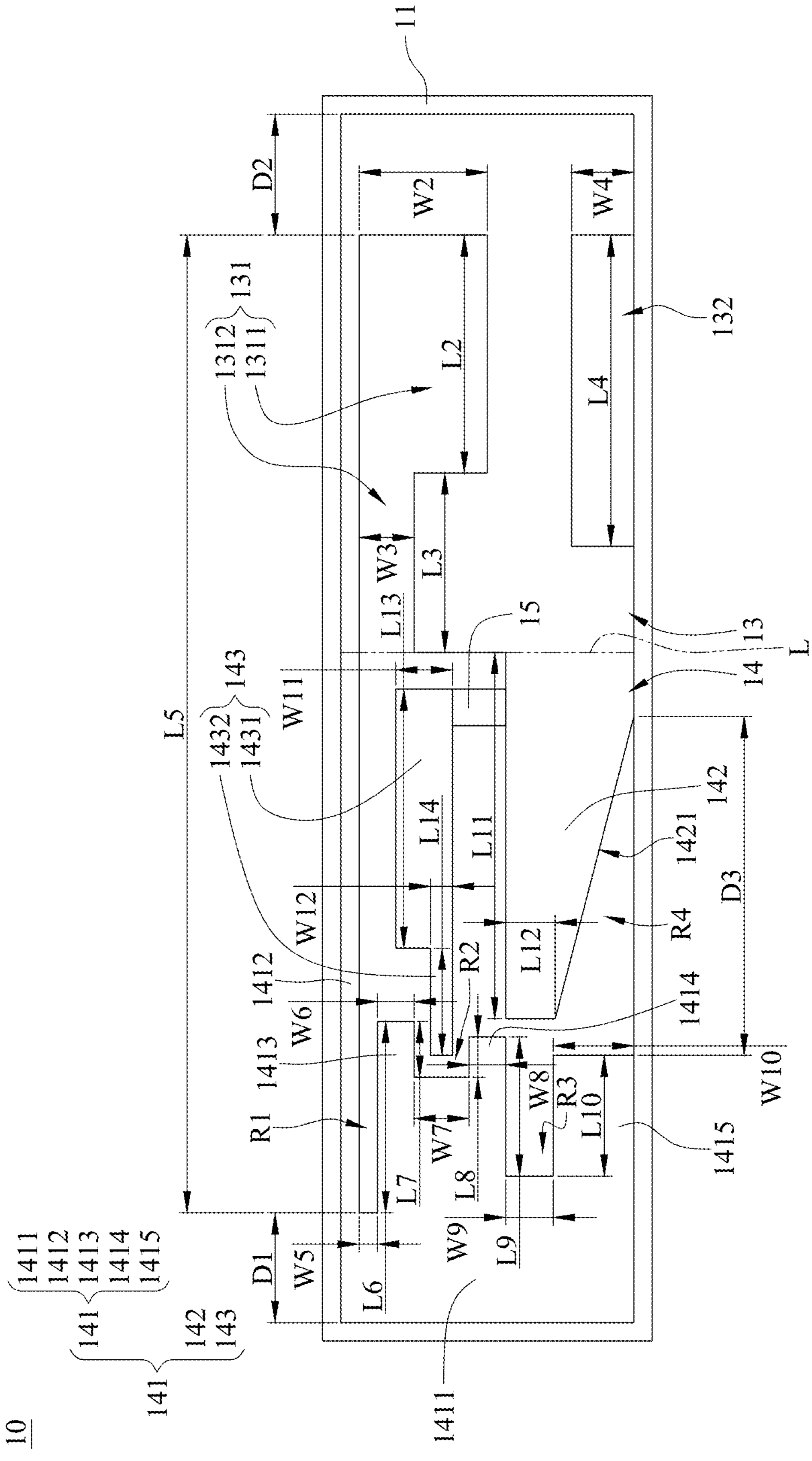
FIG. 4 is a plane view of the antenna device in FIG. 1.

Please refer to FIG. 1 to FIG. 4, where FIG. 1 is a perspective view of an antenna device 10 in accordance with an embodiment of the invention, FIG. 2 is a cross-sectional view of the antenna device 10 in FIG. 1, FIG. 3 is an exploded view of the antenna device 10 in FIG. 1, and FIG. 4 is a plane view of the antenna device 10 in FIG. 1.

In this embodiment, the antenna device 10 is applied to, for example, an all-in-one server, and includes a resonance casing 11, a substrate 12, a high frequency component 13, a low frequency component 14 and a feeding portion 15. The substrate 12 is disposed on the resonance casing 11. In detail, the resonance casing 11 has a resonator 111. A part of the substrate 12 is located in the resonator 111, and the other part of the substrate 12 is exposed outside the resonator 111.

The high frequency component 13 is disposed on the substrate 12, and has a high frequency excitation slot 131 and a high frequency matching slot 132 spaced apart from each other. The high frequency excitation slot 131 is configured to excite signals in a frequency band ranging from 5.15 GHz to 7.125 GHz, and is spaced apart from a side edge of the substrate 12. The high frequency matching slot 132 is configured to match a bandwidth of a high frequency impedance, and is, for example, located on a side edge of the substrate 12. The high frequency excitation slot 131 has a wide section 1311 and a narrow section 1312. The wide section 1311 is connected to the narrow section 1312. A width W2 of the wide section 1311 is greater than a width W3 of the narrow section 1312.

The low frequency component 14 includes a first low frequency portion 141, a second low frequency portion 142 and a third low frequency portion 143 spaced apart from each other. The first low frequency portion 141, the second low frequency portion 142 and the third low frequency portion 143 are disposed on the substrate 12, and are located on a side of the high frequency component 13. In detail, the high frequency component 13 and the low frequency component 14 are divided via a dividing line L, and the dividing line L is aligned with a side of the narrow section 1312 away from the wide section 1311.

The first low frequency portion 141 is located on a side of the narrow section 1312 away from the wide section 1311. The first low frequency portion 141 includes a base 1411, a first protrusion 1412, a second protrusion 1413, a third protrusion 1414 and a fourth protrusion 1415. The first protrusion 1412, the second protrusion 1413, the third protrusion 1414 and the fourth protrusion 1415 are sequentially arranged, and protrude from the base 1411 toward the high frequency component 13. The second protrusion 1413 and the third protrusion 1414 are, for example, asymmetric. That is, the second protrusion 1413 and the third protrusion 1414 protrude from the base 1411 at different distances. For example, a length of the second protrusion 1413 is greater than a length of the third protrusion 1414.

The first protrusion 1412 is connected to a portion of the high frequency component 13 close to the narrow section 1312. A first low frequency excitation slot R1 is formed between the first protrusion 1412 and the second protrusion 1413. A second low frequency excitation slot R2 is formed between the second protrusion 1413 and the third protrusion 1414. A third low frequency excitation slot R3 is formed between the third protrusion 1414 and the fourth protrusion 1415. The first low frequency excitation slot R1, the second low frequency excitation slot R2 and the third low frequency excitation slot R3 are, for example, rectangular, and are configured to excite the signals in a frequency band ranging from 2.4 GHz to 2.5 GHz.

A depth of the first low frequency excitation slot R1 extending toward the base 1411 is, for example, greater than a depth of the third low frequency excitation slot R3 extending toward the base 1411. The depth of the third low frequency excitation slot R3 extending toward the base 1411 is, for example, greater than a depth of the second low frequency excitation slot R2 extending toward the base 1411. In addition, a distance D1 between the first low frequency excitation slot R1 and a side edge of the substrate 12 is, for example, less than a distance D2 between the high frequency component 13 (i.e., the high frequency excitation slot 131 and the high frequency matching slot 132) and an opposite side edge of the substrate 12, but the invention is not limited thereto. In other embodiments, the distance between the first low frequency excitation slot and a side edge of the substrate may be greater than the distance between the high frequency component (i.e., the high frequency excitation slot and the high frequency matching slot) and an opposite side edge of the substrate.

A side of the second low frequency portion 142 away from the third low frequency portion 143 has a low frequency matching slot R4. The low frequency matching slot R4 is configured to match a bandwidth of a low frequency impedance, and the low frequency matching slot R4 and the high frequency matching slot 132 is, for example, connected to the same side edge of the substrate 12. The low frequency matching slot R4 is approximately, for example, triangular.

The second low frequency portion 142 is connected to the high frequency component 13, and is adjacent to the high frequency matching slot 132. The third low frequency portion 143 is spaced apart from the high frequency component 13. The high frequency component 13, the first low frequency portion 141 and the second low frequency portion 142 together surround the third low frequency portion 143. The third low frequency portion 143 and the second low frequency portion 142 correspond to the second low frequency excitation slot R2 and the third low frequency excitation slot R3, respectively. The third low frequency portion 143 is configured to transmit the signals, and includes a wide part 1431 and a narrow part 1432. The wide part 1431 is connected to the narrow part 1432. A width W11 of the wide part 1431 is greater than a width W12 of the narrow part 1432. At least a part of the narrow part 1432 is located between the second protrusion 1413 and the third protrusion 1414. In detail, the narrow part 1432 is spaced apart from the second protrusion 1413, and is spaced apart from the third protrusion 1414.

The feeding portion 15 is configured for the signals to be fed into the antenna device 10. The feeding portion 15 is disposed on the substrate 12, and is located between the narrow part 1432 of the third low frequency portion 143 and the second low frequency portion 142. The feeding portion 15 is, for example, flushed with a side edge of the wide part 1431 away from the narrow part 1432. A side of the second low frequency portion 142 away from the third low frequency portion 143 has an inclined edge 1421. The inclined edge 1421 does not extend beyond an extension line along which the feeding portion 15 is flushed with the wide part 1431. In addition, an angle between the inclined edge 1421 and an adjacent side edge of the substrate 12 is, for example, less than or equal to 45 degrees.

In this embodiment, the substrate 12 of the antenna device 10 is disposed on the resonance casing 11. The high frequency component 13 has a high frequency excitation slot 131 and a high frequency matching slot 132. The third low frequency portion 143 and the second low frequency portion 142 of the low frequency component 14 correspond to the second low frequency excitation slot R2 and the third low frequency excitation slot R3, respectively. Therefore, the antenna device 10 can have or correspond to the frequency band of WiFi 7, and the return loss of this frequency band can be reduced so as to meet communication requirements of WiFi 7. In addition, signal noises can be reduced via the combination of the substrate 12 and the resonance casing 11. Accordingly, the communication stability of the antenna device 10 can be enhanced, thereby improving the communication quality of the antenna device 10.

In addition, compared with the conventional antenna device, the substrate 12 of the antenna device 10 of this embodiment has a greater thickness T1. Accordingly, the antenna device 10 can be facilitated to excite the low frequency band, and a length L1 of the substrate 12 and a width W1 of the substrate 12 can be reduced. Therefore, the overall size of the substrate 12 can be reduced, thereby reducing a space occupied by the substrate 12. Moreover, the signal coupling between the high frequency component 13 and the low frequency component 14 can be facilitated via the substrate 12 partially exposed outside the resonator 111.

In this embodiment, the length L1 of the substrate 12 is, for example, 35 millimeters. The width W1 of the substrate 12 is, for example, 18 millimeters. The thickness T1 of the substrate 12 is, for example, 1.6 millimeters. In addition, a thickness T11 of the substrate 12 exposed outside the resonator 111 is, for example, greater than or equal to one-eighth of the thickness T1 of the substrate 12, and is, for example, less than or equal to one-half of the thickness T1 of the substrate 12. That is, the thickness T11 of the substrate 12 exposed outside the resonator 111 is, for example, greater than or equal to 0.2 millimeters, and is, for example, less than or equal to 0.8 millimeters. For example, the thickness T11 of the substrate 12 exposed outside the resonator 111 is 0.4 millimeters.

In this embodiment, a length L2 of the wide section 1311 of the high frequency excitation slot 131 is, for example, 6.5 millimeters. The width W2 of the wide section 1311 is, for example, 3.5 millimeters. A length L3 of the narrow section 1312 of the high frequency excitation slot 131 is, for example, 4.9 millimeters. The width W3 of the narrow section 1312 is, for example, 1.5 millimeters. A length L4 of the high frequency matching slot 132 is, for example, 8.5 millimeters. A width W4 of the high frequency matching slot 132 is, for example, 1.7 millimeters.

In this embodiment, a total length L5 of the first protrusion 1412, the narrow section 1312 and the wide section 1311 is, for example, 26.7 millimeters. A length L6 of a side edge of the first low frequency excitation slot R1 close to the second protrusion 1413 is, for example, 5.225 millimeters. A width W5 of the first low frequency excitation slot R1 is, for example, 0.5 millimeters. A length L7 of the second protrusion 1413 is, for example, 1.525 millimeters. A width W6 of the second protrusion 1413 is, for example, 1 millimeter. A width W7 of the second low frequency excitation slot R2 is, for example, 1.5 millimeters. A length L8 of the third protrusion 1414 is, for example, 1.1 millimeters. A width W8 of the third protrusion 1414 is, for example, 1 millimeter. A length L9 of a side edge of the third low frequency excitation slot R3 close to the third protrusion 1414 is, for example, 3.8 millimeters. A width W9 of the third low frequency excitation slot R3 is, for example, 1.3 millimeters. A length L10 of the fourth protrusion 1415 is, for example, 3.3 millimeters. A width W10 of the fourth protrusion 1415 is, for example, 2.2 millimeters.

In this embodiment, a length L11 of a side edge of the second low frequency portion 142 close to the third low frequency portion 143 is, for example, 10 millimeters. A distance D3 between the fourth protrusion 1415 and an end of the inclined edge 1421 away from the third low frequency excitation slot R3 is, for example, 8.7 millimeters. A length L12 of a side edge of the second low frequency portion 142 corresponding to the third low frequency excitation slot R3 is, for example, 1.35 millimeters.

In this embodiment, a length L13 of the wide part 1431 of the third low frequency portion 143 is, for example, 7.075 millimeters. The width W11 of the wide part 1431 is, for example, 0.95 millimeters. A length L14 of the narrow part 1432 of the third low frequency portion 143 is, for example, 2.925 millimeters. The width W12 of the narrow part 1432 is, for example, 0.6 millimeters.

Figure 5:
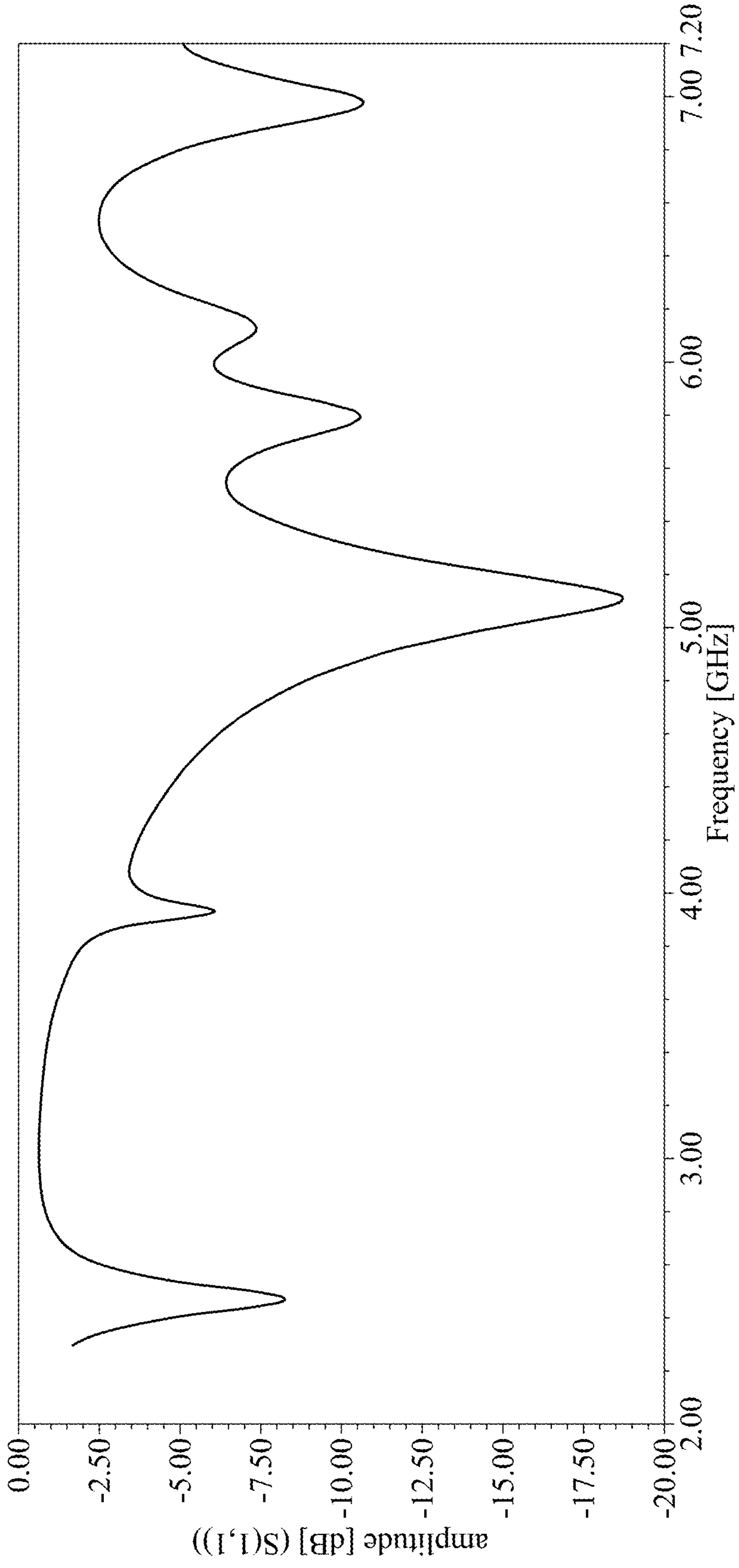
FIG. 5 is a graph showing a return loss of the antenna device in FIG. 1.
Figure 6:
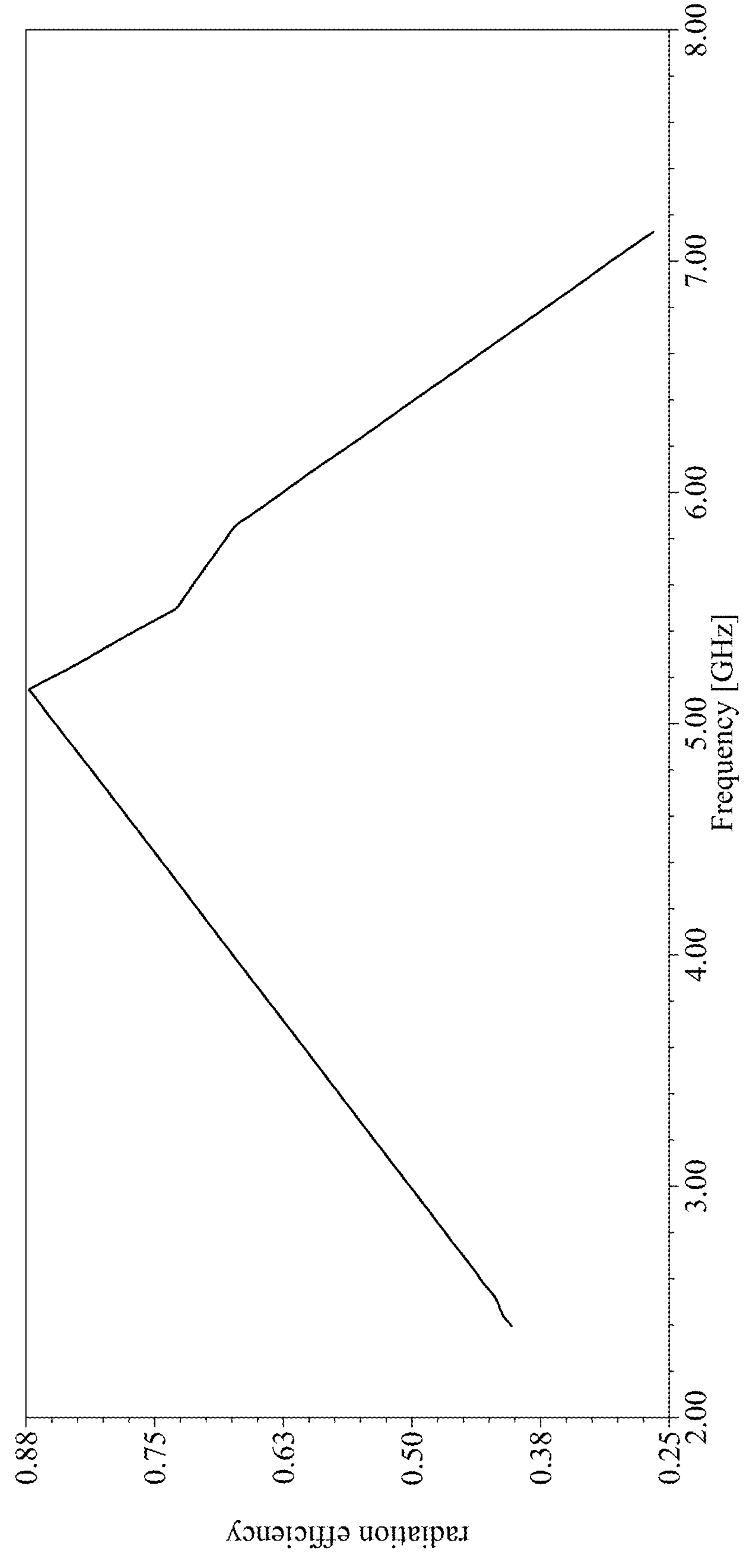
FIG. 6 is a graph showing a radiation efficiency of the antenna device in FIG. 1.

Please refer to FIG. 5 and FIG. 6, where FIG. 5 is a graph showing a return loss of the antenna device 10 in FIG. 1, and FIG. 6 is a graph showing a radiation efficiency of the antenna device 10 in FIG. 1.

As shown in FIG. 5, in the low frequency band ranging from 2.4 GHz to 2.5 GHz or in the high frequency band ranging from 5.15 GHz to 7.125 GHz, the return loss of the antenna device 10 of this embodiment is slightly greater than −6 dB in a few frequency band. In the rest of the aforementioned frequency band, the return loss is less than −6 dB or even less than −10 dB. That is, the impedance matching of the antenna device 10 with the aforementioned structural design is good.

In addition, as shown in FIG. 6, in a frequency band ranging from 5 GHz to 5.2 GHz, the antenna device 10 of this embodiment can have a maximum radiation efficiency exceeding 0.8. The so-called "radiation efficiency" refers to a ratio of an output power to an input power of an antenna.

Generally, the higher the gain of the antenna is, the more concentrated the radiation from the antenna is, and the farther the signal radiated from the antenna is allowed to be transmitted in a specific direction. In this embodiment, in the aforementioned frequency band, the antenna device 10, for example, has a gain of 1.1 dBi at a frequency of 2.4 GHz, and has a gain of 3.03 dBi at a frequency of 5.15 GHz.

According to the antenna device disclosed in the above embodiment, the substrate of the antenna device is disposed on the resonance casing. The high frequency component has a high frequency excitation slot and a high frequency matching slot. The third low frequency portion and the second low frequency portion of the low frequency component correspond to the second low frequency excitation slot and the third low frequency excitation slot, respectively. Therefore, the antenna device can have or correspond to the frequency band of WiFi 7, and the return loss of this frequency band can be reduced so as to meet communication requirements of WiFi 7. In addition, signal noises can be reduced via the combination of the substrate and the resonance casing. Accordingly, the communication stability of the antenna device can be enhanced, thereby improving the communication quality of the antenna device.

In addition, compared with the conventional antenna device, the substrate of the antenna device of this embodiment has the greater thickness. Accordingly, the antenna device can be facilitated to excite the low frequency band, and a length of the substrate and a width of the substrate can be reduced. Therefore, the overall size of the substrate can be reduced, thereby reducing a space occupied by the substrate. Moreover, the signal coupling between the high frequency component and the low frequency component can be facilitated via the substrate partially exposed outside the resonator.

It will be apparent to those skilled in the art that various modifications and variations can be made to the invention. It is intended that the specification and examples be considered as exemplary embodiments only, with the scope of the invention being indicated by the following claims.

What is claimed is:

1. An antenna device, comprising:

a resonance casing;

a substrate, disposed on the resonance casing;

a high frequency component, disposed on the substrate, wherein the high frequency component has a high frequency excitation slot and a high frequency matching slot spaced apart from each other, the high frequency excitation slot has a wide section and a narrow section, the wide section is connected to the narrow section, and a width of the wide section is greater than a width of the narrow section; and a low frequency component, comprising a first low frequency portion, a second low frequency portion and a third low frequency portion, wherein the first low frequency portion, the second low frequency portion and the third low frequency portion are disposed on the substrate, and are located on a side of the high frequency component, the first low frequency portion is located on a side of the narrow section away from the wide section, the second low frequency portion is connected to the high frequency component, and is adjacent to the high frequency matching slot, the third low frequency portion is spaced apart from the high frequency component, the high frequency component, the first low frequency portion and the second low frequency portion together surround the third low frequency portion, and a side of the second low frequency portion away from the third low frequency portion has a low frequency matching slot;

wherein the first low frequency portion comprises a base, a first protrusion, a second protrusion, a third protrusion and a fourth protrusion, the first protrusion, the second protrusion, the third protrusion and the fourth protrusion are sequentially arranged and connected to the base, and extend toward the high frequency component, the first protrusion is connected to a portion of the high frequency component close to the narrow section, a first low frequency excitation slot is formed between the first protrusion and the second protrusion, a second low frequency excitation slot is formed between the second protrusion and the third protrusion, a third low frequency excitation slot is formed between the third protrusion and the fourth protrusion, and the third low frequency portion and the second low frequency portion correspond to the second low frequency excitation slot and the third low frequency excitation slot, respectively.

2. The antenna device according to claim 1, wherein the high frequency excitation slot is spaced apart from a side edge of the substrate, the high frequency matching slot and the low frequency matching slot is connected to a side edge of the substrate, a depth of the first low frequency excitation slot extending toward the base is greater than a depth of the third low frequency excitation slot extending toward the base, and the depth of the third low frequency excitation slot extending toward the base is greater than a depth of the second low frequency excitation slot extending toward the base.

3. The antenna device according to claim 1, wherein a distance between the first low frequency excitation slot and a side edge of the substrate is greater than a distance between the high frequency component and an opposite side edge of the substrate.

4. The antenna device according to claim 1, wherein the second protrusion and the third protrusion are asymmetric.

5. The antenna device according to claim 1, wherein the third low frequency portion comprises a wide part and a narrow part, the wide part is connected to the narrow part, a width of the wide part is greater than a width of the narrow part, and at least a part of the narrow part is located between the second protrusion and the third protrusion.

6. The antenna device according to claim 5, further comprising a feeding portion, wherein the feeding portion is disposed on the substrate, and is located between the narrow part of the third low frequency portion and the second low frequency portion, the feeding portion is aligned with a side of the narrow part away from the wide part, a side of the second low frequency portion away from the third low frequency portion has an inclined edge, and an extension line extending from the inclined edge toward a direction away from the third low frequency excitation slot does not extend beyond an extension line along which the feeding portion is aligned with the narrow part.

7. The antenna device according to claim 6, wherein a distance between the fourth protrusion and an end of the inclined edge away from the third low frequency excitation slot is 8.7 millimeters.

8. The antenna device according to claim 5, wherein a length of the narrow part of the third low frequency portion is 2.925 millimeters, the width of the narrow part is 0.6 millimeters, a length of the wide part of the third low frequency portion is 7.075 millimeters, and the width of the wide part is 0.95 millimeters.

9. The antenna device according to claim 1, wherein the resonance casing has a resonator, a part of the substrate is located in the resonator, another part of the substrate is exposed outside the resonator, and a thickness of the substrate exposed outside the resonator is greater than or equal to one-eighth of a thickness of the substrate, and is less than or equal to one-half of the thickness of the substrate.

10. The antenna device according to claim 1, wherein a length of the wide section of the high frequency excitation slot is 6.5 millimeters, a width of the wide section is 3.5 millimeters, a length of the narrow section of the high frequency excitation slot is 4.9 millimeters, a width of the narrow section is 1.5 millimeters, a length of the high frequency matching slot is 8.5 millimeters, a width of the high frequency matching slot is 1.7 millimeters, a total length of the first protrusion, the narrow section and the wide section is 26.7 millimeters, a length of a side edge of the first low frequency excitation slot close to the second protrusion is 5.225 millimeters, a width of the first low frequency excitation slot is 0.5 millimeters, a length of the second protrusion is 1.525 millimeters, a width of the second protrusion is 1 millimeter, a width of the second low frequency excitation slot is 1.5 millimeters, a length of the third protrusion is 1.1 millimeters, a width of the third protrusion is 1 millimeter, a length of a side edge of the third low frequency excitation slot close to the third protrusion is 3.8 millimeters, a width of the third low frequency excitation slot is 1.3 millimeters, a length of the fourth protrusion is 3.3 millimeters, a width of the fourth protrusion is 2.2 millimeters, a length of a side edge of the second low frequency portion close to the third low frequency portion is 10 millimeters, and a length of a side edge of the second low frequency portion corresponding to the third low frequency excitation slot is 1.35 millimeters.

* * * * *